(12) United States Patent
Kroboth et al.

(10) Patent No.: US 7,373,403 B2
(45) Date of Patent: *May 13, 2008

(54) METHOD AND APPARATUS FOR DISPLAYING MEASUREMENT DATA FROM HETEROGENEOUS MEASUREMENT SOURCES

(75) Inventors: Robert H. Kroboth, Colorado Springs, CO (US); David L. Barnard, Sunnyvale, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 1159 days.

This patent is subject to a terminal disclaimer.

(21) Appl. No.: 10/225,191

(22) Filed: Aug. 22, 2002

(65) Prior Publication Data

US 2004/0037230 A1 Feb. 26, 2004

(51) Int. Cl.
*G06F 15/173* (2006.01)
*G06F 17/00* (2006.01)
(52) U.S. Cl. .................. 709/224; 702/193; 370/252
(58) Field of Classification Search ............ 709/224, 709/225, 229, 217, 218, 250, 249; 702/127, 702/193; 370/241, 252
See application file for complete search history.

(56) References Cited

U.S. PATENT DOCUMENTS 4,965,830 A * 10/1990 Barham et al. ............ 704/226
5,333,069 A * 7/1994 Spence ..................... 358/517
6,256,773 B1 * 7/2001 Bowman-Amuah ........ 717/121
6,564,174 B1 * 5/2003 Ding et al. ................ 702/186
6,681,232 B1 * 1/2004 Sistanizadeh et al. .... 707/104.1
6,810,367 B2 * 10/2004 Barnard ..................... 702/193
6,826,507 B2 * 11/2004 Kroboth et al. ............ 702/127
7,103,807 B2 * 9/2006 Bosa et al. .................. 714/43
2002/0105911 A1 * 8/2002 Pruthi et al. ............... 370/241
2003/0103461 A1 * 6/2003 Jorgenson .................. 370/241
2004/0039970 A1 * 2/2004 Barnard et al. .............. 714/43

* cited by examiner

*Primary Examiner*—Zarni Maung

(57) ABSTRACT

A system to collect heterogeneous scalar measurement data over a network from a plurality of devices connected to the network, and normalize the collected heterogeneous scalar measurement data based on a mathematical transform of collected scalar measurement data into a common mathematical space. The transformed scalar measurement data is displayed in graphical representations such that transformed scalar measurement data from a particular network device can be displayed alongside a graphical representation of a transformed scalar measurement data from a different particular network device. Thus, transformed scalar measurement data from different heterogeneous network devices can be aggregated and displayed in the same graphical representation.

24 Claims, 7 Drawing Sheets

METHOD AND APPARATUS FOR DISPLAYING MEASUREMENT DATA FROM HETEROGENEOUS MEASUREMENT SOURCES

BACKGROUND OF THE INVENTION

With the growing reliance on networks, and accordingly network stability, network administrators need to be able to monitor and troubleshoot networks, which can be accomplished through use of monitoring devices on the networks. Examples of devices from which measurements may need to be taken include, for example, routers) switches, servers, clients, PCs, telecommunications equipment, voice gateways, etc. An example of a monitoring and/or troubleshooting of a network may include a network administrator viewing usage of a network on a display or having the capability to access additional measurement data of that network usage by drilling down to more detailed measurement data. Typically, the displaying of measurement data will include displaying graphs or plots illustrating graphically the measurement data versus a predetermined unit, e.g., an average usage of a network per hour. Drilling down to more detailed measurement data may include the capability to access measurement data used in formulating such graphically illustrated measurement data, i.e., the ability to view or print out the raw data used in generating the graphic or reformulating the graphic based on more fine criteria.

Typically, the monitoring of such network devices is accomplished seamlessly since all the network devices may be controlled by one protocol, for example, SNMP. However, multiple other protocols exist, such as XML and CMIP, which are also used by the network devices when transferring measurement data or by a control unit collecting measurement data from multiple network devices. Similarly, measurement data, which is collected by a network device, transferred from the network device, and collected by a control unit, will have a particular format, e.g., floating point, integer, negative value capability, positive value capability, binary, hexadecimal, logarithmic, etc.

Scalar measurement data from a plurality of network devices that are not all monitored using the same protocol is typically defined as being heterogeneous as to its source. In contrast, scalar measurement data from a plurality of network device that are monitored using the same protocol is typically defined as homogeneous as to its source. In networks containing network devices that are controlled by heterogeneous protocols, network administrators are required to individually monitor or display the network devices controlled by that protocol, separate from other network devices controlled by another protocol, or to monitor or display in a single graphic illustration measurement data from multiple network devices when all the network devices are not controlled by the same protocol. In some instances, network administrators create individualized simplified homogeneous solutions. For example, in a network containing CMIP and SNMP protocols, a CMIP management system can be set up with a gateway to receive SNMP data. The gateway then emulates the SNMP data to correspond to CMIP data based on a simplification of the differences between SNMP and CMIP data, so the measurement data can all be collected and displayed based on the CMIP protocol. However, such solutions must be individually designed, tested, and implemented. Further, individual design, testing, and implementation occupies valuable time and resources. A need exists for a universal data model that is able to commonly display the heterogeneous scalar measurement data.

SUMMARY OF THE INVENTION

The present invention provides a universal data model that is able to set a common transform of heterogeneous scalar measurement data from heterogeneous network devices to allow concurrent aggregative display of the transformed heterogeneous scalar measurement data.

The present invention provides a system displaying heterogeneous measurement data, including collecting heterogeneous scalar measurement data from a plurality of devices connected to a network, normalizing the collected heterogeneous scalar measurement data by using a mathematical transform to transform at least two heterogeneous scalar measurement data each into a homogeneous mathematical transform space, and displaying at least one of the two transformed heterogeneous scalar measurement data.

The present invention provides a system that includes a plurality of data collectors to collect heterogeneous scalar measurement data from a plurality of network devices, a normalization unit to normalize heterogeneous scalar measurement data, based on the collected heterogeneous scalar measurement data, by using a mathematical transform to transform at least two heterogeneous scalar measurement data each into a homogeneous mathematical transform space, and a display unit to display at least one of the two transformed heterogeneous scalar measurement data.

These together with other advantages that will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

These and other objects and advantages of the present invention will become apparent and more readily appreciated from the following description of the preferred embodiments, taken in conjunction with the accompanying drawings, of which.

DETAILED DESCRIPTION OF THE PREFERRED EMBODIMENTS

Figure 1:
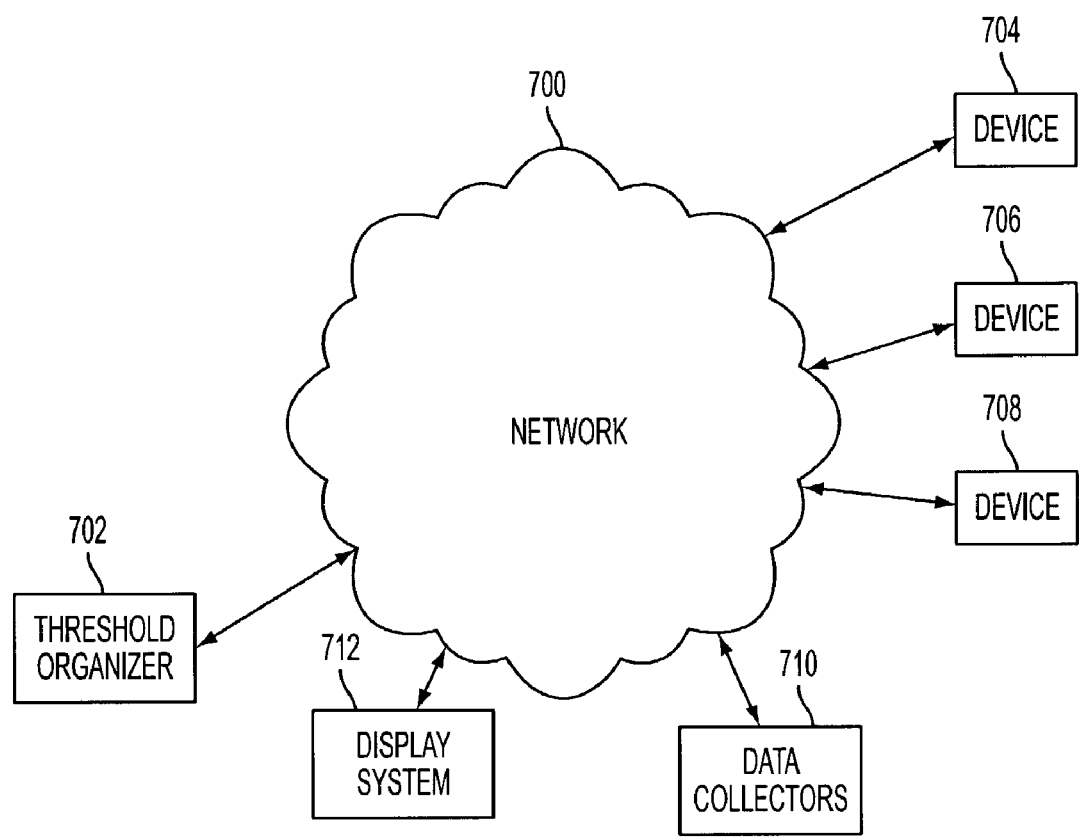
FIG. 1 is a diagram illustrating a network connected to a plurality of devices, a data collector, a display system, and a threshold organizer, according to embodiments of the present invention.

Reference will now be made in detail to the present preferred embodiments of the present invention, examples of which are illustrated in the accompanying drawings, wherein like reference numerals refer to like elements throughout.

Network devices may be controlled via different protocols, e.g., SNMP, XML, CMIP, http, Corba, IEEE-488, IDL, TL1, SCPI, ASCII, etc. The term "heterogeneous" is defined as "different in kind; unlike; incongruous." Random House Webster's Unabridged Dictionary 897 ($2^{nd}$ ed. 1998). Scalar measurement data taken from a plurality of network devices controlled via different protocols is heterogeneous, for example, as to its source as well as, for example, type of value (e.g., floating point, integer, signed, unsigned, etc.), scale (e.g., truncated, positive, negative, variable, etc.), and/or time scale (e.g., intervalized, asynchronous, etc.). The present invention allows for common heterogeneous scalar measurement data to be displayed.

For example, if a network contains a PC and several heterogeneous network device including a router which maintains a counter that is available by SNMP to count how many packets go through the router, a network administrator may want to monitor the rate of packet flow through the router. If too many packets per second are flowing through the router, the network may become congested. The network administrator would need to gather the SNMP data, process the data, and determine whether a threshold has been, will be, or is currently exceeded (i.e., too many packets per second). Further, based on a sampling over a period of time, for example, an overall congestion of the network can be illustrated in a graphical format for quick and easy digesting of such information.

FIG. 1 is a diagram illustrating a network connected to a plurality of devices, a data collector, a display system, and a threshold organizer, according to embodiments of the present invention. Referring now to FIG. 1, network 700 may be any type of network, e.g., a LAN, WAN, switched, unswitched, ATM, ISDN, wireless, the Internet, etc. However, embodiments of the present invention are not limited thereto. For example, network 700 could be a switching mesh that directly connects connected devices. Devices 704, 706, and 708 are connected to network 700 and may be any type of network devices, e.g., a network element, a router, a switch, a PC, etc. For purposes of illustration, only three network devices are shown; however, embodiments of the present invention are not so limited. For example, there may be greater or fewer than three network devices connected to network 700. Devices 704-708 are controlled via a plurality of protocols, e.g., SNMP, XML, CMIP, etc. Typically the network devices can also each act as agents, e.g., an SNMP agent. An agent may have the capability to handle a remote conversation (input/output) and include a functionality of allowing the launching of a user interface for that agent.

Data collectors 710 (illustrated as one unit, but not limited thereto) are connected to network 700, and they, as a whole, collect heterogeneous scalar measurement data from devices 704, 706, and 708. Data collectors 710 each interact with one or more network devices, using whatever transmission methodology used by that network device, e.g., frames, packets, cells, etc., to collect scalar measurement data from each network device, and output the scalar measurement data in a transmission methodology compatible with network 700 and/or threshold organizer 702. It is noted, though, that embodiments of the present invention are not limited to a particular number of data collectors. Threshold organizer 702 is also connected to network 700, and receives the collected data from the collectors if a collector is necessary to receive the scalar measurement data from a network device. Threshold organizer 702 normalizes the collected heterogeneous scalar measurement data based on a threshold or thresholds for each particular type of scalar measurement data (e.g., a throughput of data in frames/sec or a latency in milliseconds). Display system 712 is also connected to network 700, and may be a publish/subscribe system that displays the collected and normalized measurement data. Display system 712 can include merely a monitor connected to a processor controlling the format and display of data, or may involve a publication of the data or display of data to a remote location or device (e.g., through a network or the Internet).

Figure 2:
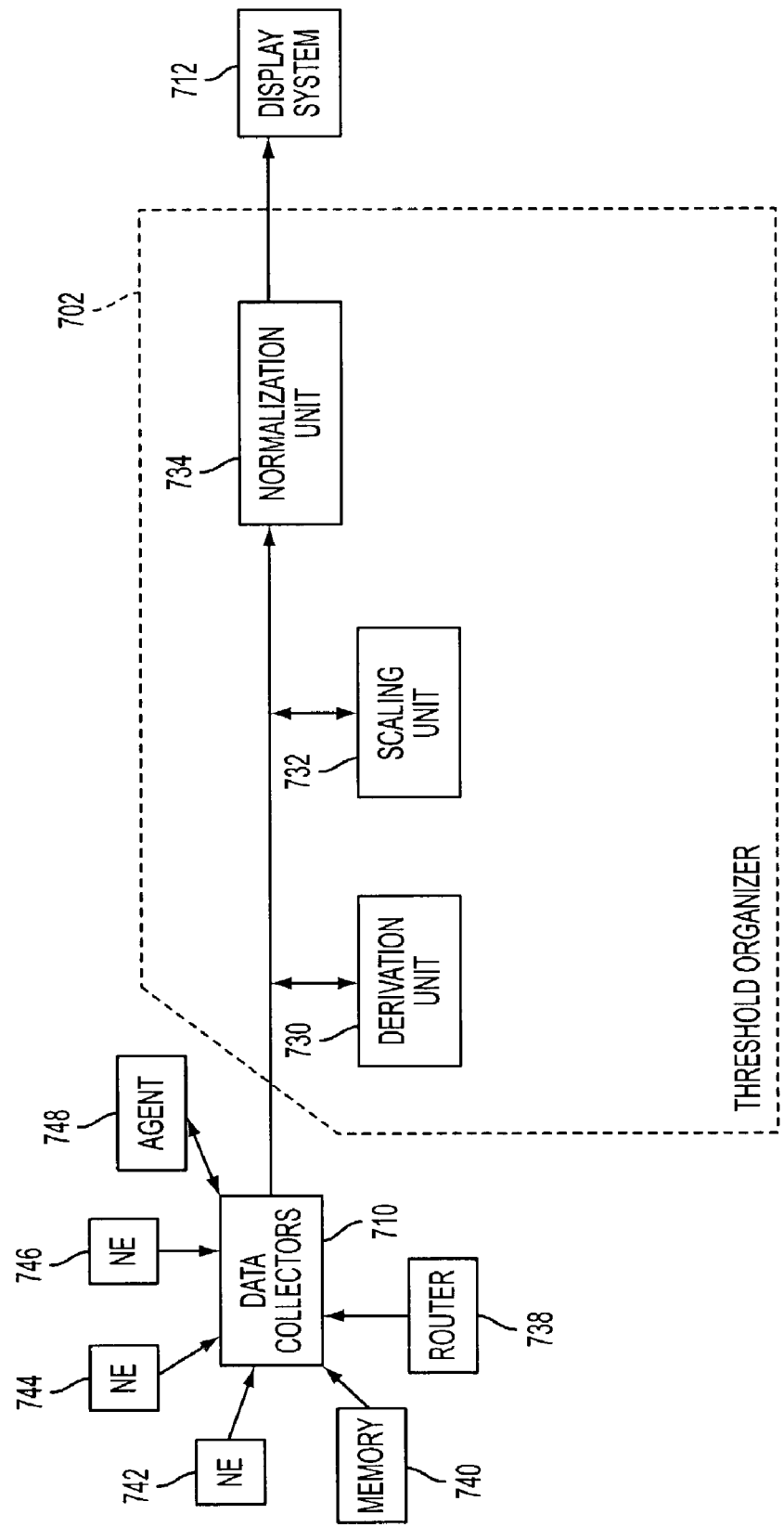
FIG. 2 is a diagram illustrating a more detailed view of the threshold organizer, the data collector, and the display system, according to embodiments of the present invention.

FIG. 2 is a diagram illustrating a more detailed view of the threshold organizer, the data collectors, and the display system. Referring now to FIG. 2, threshold organizer 702 is connected to data collectors 710 and display system 712 via network 700 (not shown). Data collectors 710 are connected to router 738, memory 740, network element (NE) 742, network element (NE) 744, network element (NE) 746, and agent 748 via network 700 (not shown); however, embodiments of the present invention are not limited to the devices shown. For example, data collectors 710 may be connected to any type of network device. Heterogeneous scalar measurement data may be collected by data collectors 710 and intervalized if necessary. This intervalization may include, for example, the collected heterogeneous scalar measurement data being collected on cardinal time points, whereby the values would have to be subtracted from the previous value in order to get the measurement for that data interval. However, embodiments of the present invention are not limited to a specific intervalizing technique, as other intervalizing techniques can be used.

Threshold organizer 702 includes, for example, derivation unit 730, scaling unit 732, and normalization unit 734. The collected heterogeneous scalar measurement data is derived by derivation unit 730 if data must be expressed in a different format. For example, if the collected heterogeneous scalar measurement data indicates bytes per second through router 738, that data may be derived by dividing by the speed of the router and applying appropriate factors for bits and byte diversion to get a percentage of utilization of the router. However, embodiments of the present invention are not limited to the previous example, as other derivations may occur. The collected heterogeneous scalar measurement data or the derived measurement may then be scaled by scaling unit 732 if the data needs to be converted into different units.

A network administrator may determine a threshold for each type of incoming scalar measurement data for purposes of generating an event when the threshold is crossed. For example, in regards to utilization, where zero percent utilization is the best and one hundred percent utilization is the worst, the network administrator may set a threshold at thirty-three percent utilization. Embodiments of the present invention are not limited to the setting of one threshold, as a greater number of thresholds may be set. For example, the network administrator may set another threshold at sixty-six percent utilization. Normalization unit 734 automatically normalizes the collected heterogeneous scalar measurement data, the scaled derived measurement, the scaled collected heterogeneous scalar measurement data, or the derived measurement based on these thresholds. In the embodiment with two thresholds discussed above, data might be normalized, for example, to be zero at zero percent utilization, 1 at thirty-three percent utilization, 2 at sixty-six percent utilization, and 3 at one hundred percent utilization. Data falling between the thresholds would be normalized accordingly, e.g., 1.5 at fifty percent utilization.

In an embodiment, the data is normalized by running the data through a transfer function, to transform the data into a common homogeneous mathematical space, where the following expression applies for the positive case (lower x is better):

$y = f(x)$ where $y = 3.0$ where $x \geq Cmax$ $y = 2.0 + (x - Tyr)/(Cmax - Tyr)$ where $Cmax > x \geq Tyr$ $y = 1.0 + (x - Tgy)/(Tyr - Tgy)$ where $Tyr > x \geq Tgy$ $y = x/(Tgy - Cmin)$ where $Tgy > x \geq Cmin$ $y = 0.0$ where $x < Cmin$ In this RYG transform, x is the input to the transform function, y is the output thereof, Cmin is a minimum constraint value, Cmax is a maximum constraint value, Tyr is the second threshold expressed in the same units as the x value, and Tgy is the first threshold expressed in the same units as the x value. The expression may be modified for the negative case, where higher x is better, or composite cases where there are multiple positive and negative ranges within the input function. Embodiments of the present invention are not limited to this RYG transform, as other functions for normalizing the data may be used, depending on the type of protocols that are expected to be encountered.

Figure 3A:
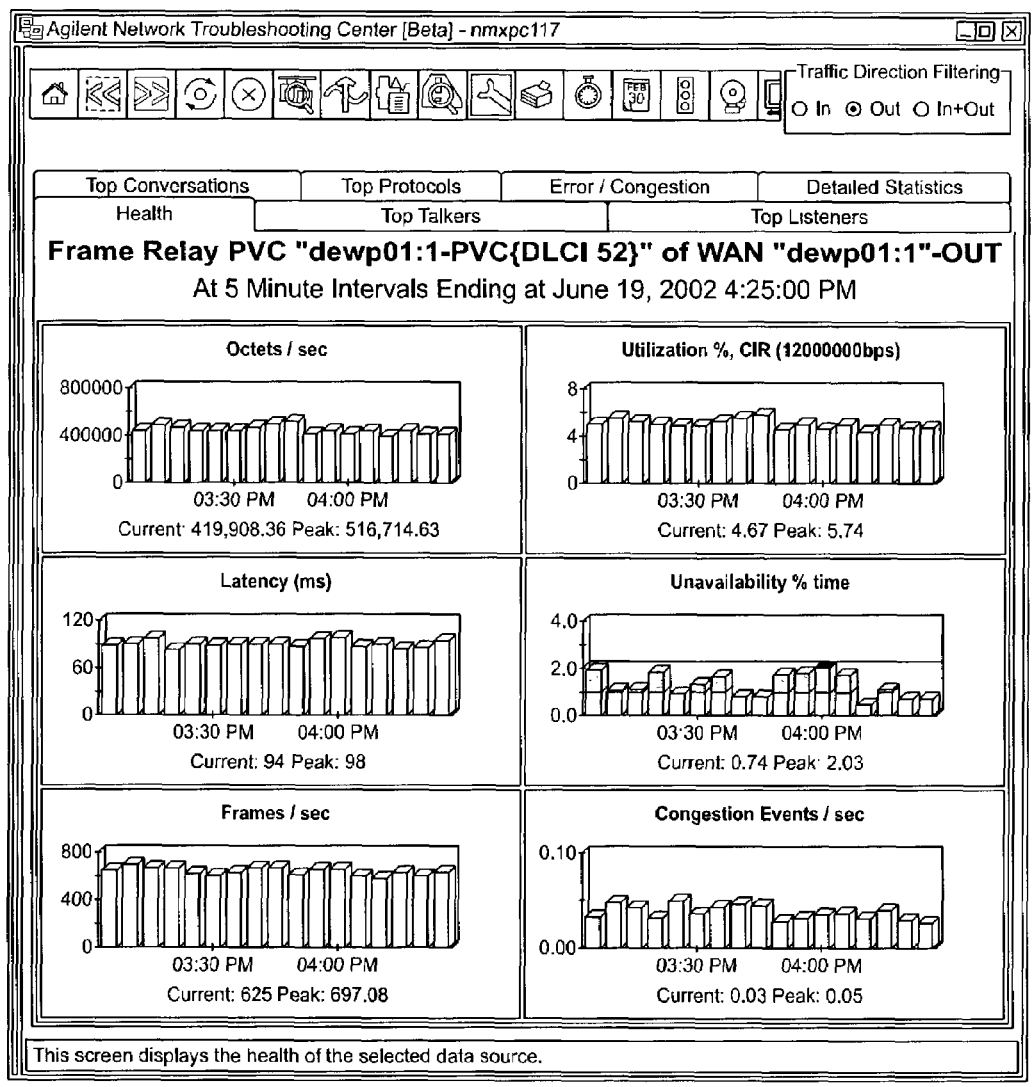
FIGS. 3A-3C are screen shot examples of displayed normalized measurement data for multiple different measurement data types in graphical representations.
Figure 3B:
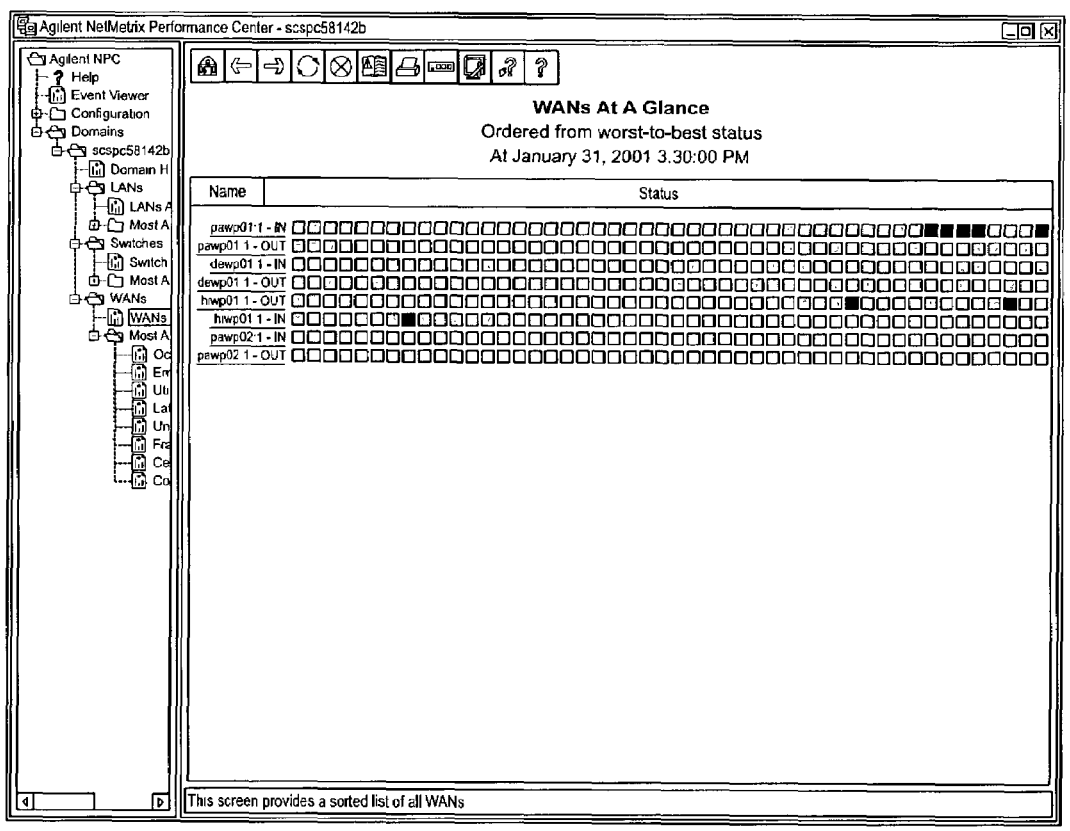
Figure 3C:
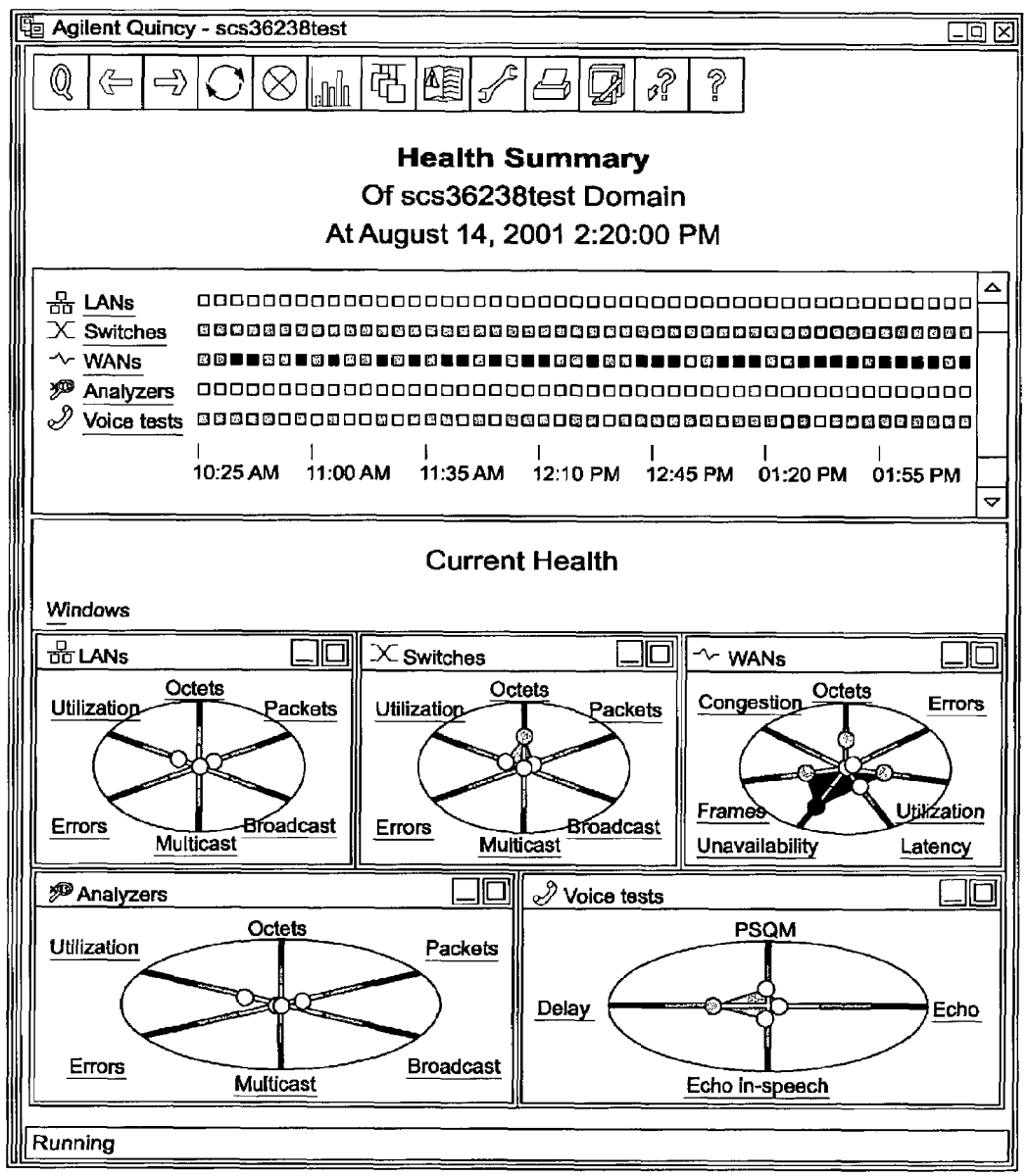

Display system 712 proceeds to receive the normalized measurement data from normalization unit 734, formats the data for display, and displays the data on a monitor, for example. The formatting for display may include an aggregation of heterogeneous measurement data from multiple heterogeneous network devices, so that only necessary or desired heterogeneous measurement data, with any specific organizing or weighting, is displayed in a graphical illustration. FIGS. 3A-3C illustrate screen shot examples of what a typical display may include. Display system 712 could, for example, take all the normalized measurement data and generate a graph of congestion events per second, which upon aggregation of all the corresponding normalized measurement data could be illustrated as shown in the bottom right corner of the FIG. 3A screen shot. In addition to the graphical representations illustrating particular measurements for particular network devices, a single graphical representation could represent an aggregation of data for an entire network, including normalized measurement data from multiple network devices. For example, FIG. 3B sets forth an illustration of WANs ordered from worst to best status, with the dark gray corresponding to a poor or warning status, white corresponding to a less severe status or alert, and with the light gray corresponding to a satisfactory or good status. FIG. 3B includes the name of a WAN or group of WANs, along one axis, and illustrates status according to the passage of time, along the other axis. FIG. 3C illustrates additional examples of potential aggregative illustrations, including an illustration of the health of LANs, switches, WANs, analyzers, and voice tests, all in one graphical representation. Further, FIG. 3C also illustrates radar charts for each of these device, or group of devices, with each radar chart including additional measurement information for each device, or group of devices, illustrating the level of health of the device measurement For example, as the circular identifiers in the radar charts move along "spokes" of the "wheel-like" chart from a central point toward an outer circumference, the health of the device, or group of devices, will be represented as reducing. The color of the circular identifier may also change from a green good status, to a yellow caution status, to a red warning status as the circular identifier moves toward the circumference of the radar chart.

Typically, display system 712 will include a user interface that will allow a network administrator, for example, to predetermine which measurement data he/she would require to be displayed. Alternatively, the displays or outputs could be automated at particular work stations along the network, outputting particular preprogrammed measurement displays or outputs, or a user could dynamically change the display to display a different graphical representation of different measurement data. As indicated above, display system 712 can include a mere monitor attached to a processor with the capability to format the graphical representations based on the normalized measurement data, a simple display anywhere along the network illustrating or outputting the normalized data based on formatting prepared in a remote processor, or the graphical representations could be accessed through a subscriber service through the Internet or dialup services. In a subscriber service a customer could access a monitoring of a network provided by a provider, or a portion of an overall network, which they may be leasing from the provider, for example. It is also noted that display system 712 may also include printers and the like to output hard copies, either off of a monitor or directly from the processor after the formatting of the normalized measurement data. It is further noted that FIGS. 3A-3C are only intended to be examples of screen shots and, of course, many variations are possible. Therefore, the present invention is not limited to any specific screen shot.

Figure 4:
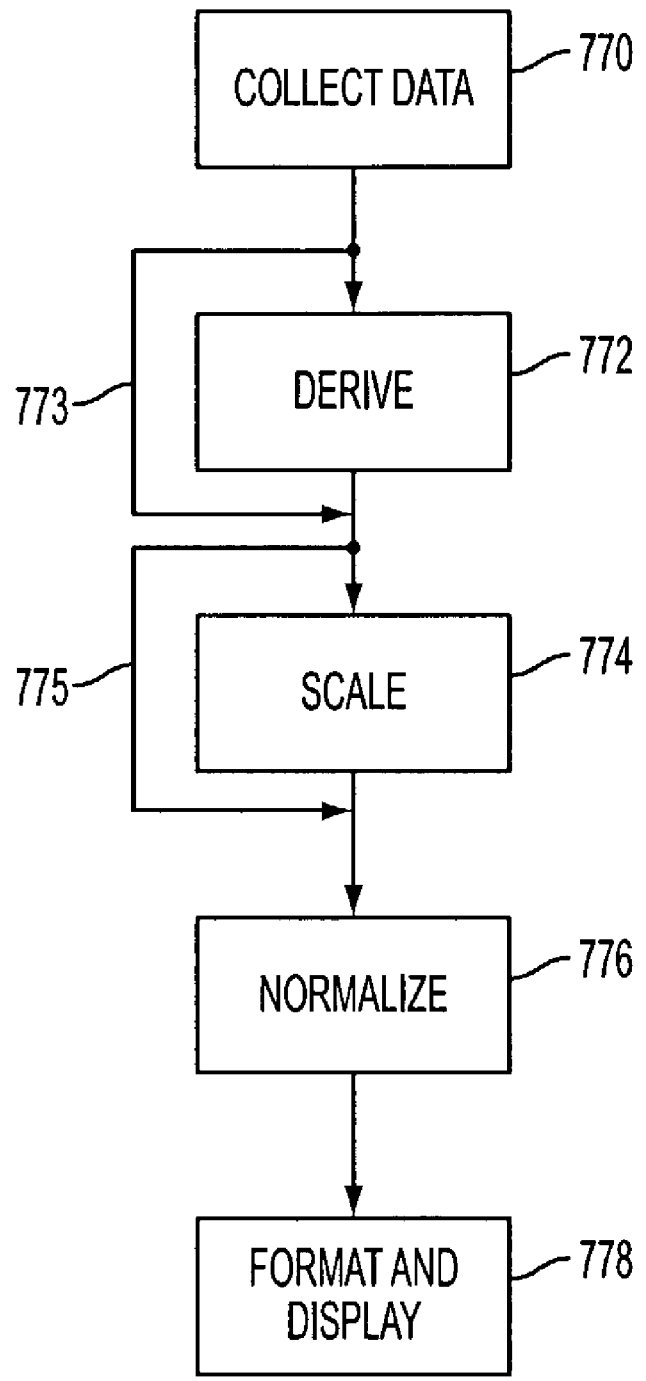
FIG. 4 is a flow diagram illustrating the flow of heterogeneous scalar measurement data through the system, according to embodiments of the present invention.
Figure 5:
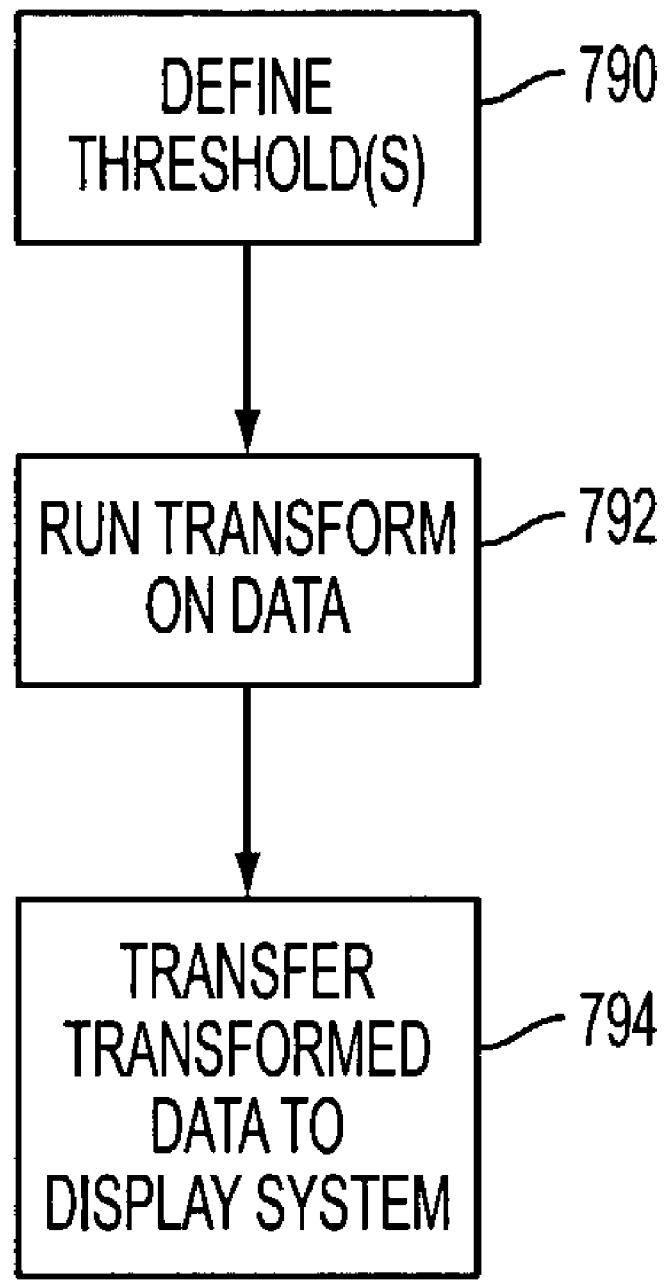
FIG. 5 is a flow diagram illustrating the normalization of data, according to embodiments of the present invention.

FIG. 4 is a flow diagram illustrating the flow of heterogeneous scalar measurement data through the system, according to embodiments of the present invention. Referring now to FIG. 4, in operation 770, heterogeneous scalar measurement data is collected. If the collected heterogeneous scalar measurement data needs to be intervalized, that is done during collection. In an embodiment, the collected heterogeneous scalar measurement data is automatically derived in operation 772. In another embodiment, nothing is derived from the collected heterogeneous scalar measurement data, and operation 772 is bypassed via branch 773. In an embodiment, the collected heterogeneous scalar measurement data, bypassing operation 772 via branch 773, is automatically scaled in operation 774. In another embodiment, the derived measurement is automatically scaled in operation 774. In a further embodiment, nothing is scaled, and operation 774 is bypassed via branch 775. The process moves to operation 776, where the collected heterogeneous scalar measurement data, the scaled derived measurement, the scaled collected heterogeneous scalar measurement data, or the derived measurement is normalized (FIG. 5 defines operation 776 in greater detail). From operation 776, the process moves to operation 778, where the normalized measurement data is displayed by the display system 712. As the displaying of normalized measurement data is typically a continuous operation, this overall process would be repeated as more and more scalar measurement data is collected. In addition, after operation 778, where the normalized measurement data is formatted and displayed, the process may return to operation 776 to collect the next normalized measurement data. It is also noted that the display system may be programmed to display a graphical representation of normalized measurement data for only particular time period, for example, and though additional normalized measurement data may be collected, the older normalized data will still be displayed until the next particular time period occurs.

FIG. 5 is a flow diagram illustrating the normalization of data in operation 776, according to embodiments of the present invention. Referring now to FIG. 5, in operation 790, the threshold(s) are defined. As stated previously, the present invention is not limited to defining or normalizing for one threshold. From operation 790, the process moves to operation 792, where a transform is run on the data based on the defined threshold(s) (see discussion thereof in regard to FIG. 2). From operation 792, the process moves to operation 794, where the normalized data is transferred to display system 712.

Embodiments of the present invention are not limited to a graph on X and Y axes using vertical display elements, nor is the present invention limited to only the types or formatting illustrated in the screen shot of FIGS. 3A-3C, e.g., a color spreadsheet or scatter plot may be used, or the formatting could include formatting information for display in three dimensions. Further, embodiments of the present invention are not limited to displaying only one type and set of measurements at a time. For example, multiple graphs may be displayed on the same screen, each graph representing a different type and set of measurements, thresholds, etc. A particular "type" of measurement data may be defined as measurement data from a particular network device of from multiple network devices and designated for illustration in a single graphical representation.

The network, network devices, data collectors, threshold organizer, display system, and subscribers included in the system may include, for example, memories, processors, and/or Application Specific Integrated Circuits ("ASICs"). Such memory may include a machine-readable medium on which is stored a set of instructions (i.e., software) embodying any one, or all, of the methodologies described herein. Software can reside, completely or at least partially, within this memory and/or within the processor and/or ASICs. For the purposes of this specification, the term "machine-readable medium" shall be taken to include any mechanism that provides (i.e., stores and/or transmits) information in a form readable by a machine (e.g., a computer). For example, a machine-readable medium may include read only memory ("ROM"), random access memory ("RAM"), magnetic disk storage media; optical storage media, flash memory devices, electrical, optical, acoustical, or other form of propagated signals (e.g., carrier waves, infrared signals, digital signals, etc.), etc. In addition, as noted above, the ultimate display of the formatted normalized measurement data may be displayed in any location remote from a processor performing the formatting, and the propagation of the formatted display information being transferred to the remote location may be carried on a carrier wave. The term remote in this instance could also at least represent a wireless connection between the processor and the display, regardless of their actual physical locations. Further, the term processor is not limiting to a single processor.

As indicated above, various procedures have been indicated as potentially being performed "automatically," which indicates that the operation is performed in an automated manner by a computer, and intervention by the network administrator is not required.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method for displaying heterogeneous measurement data, comprising:

collecting heterogeneous scalar measurement data from a plurality of devices connected to a network, at least two of the plurality of devices controlled by heterogeneous protocols;

normalizing the collected heterogeneous scalar measurement data by using a mathematical transform to transform at least two heterogeneous scalar measurement data each into a homogeneous mathematical transform space; and displaying at least one of the two transformed heterogeneous scalar measurement data.

2. The method of claim 1, wherein the collecting further comprises intervalizing the heterogeneous scalar measurement data.

3. The method of claim 1, further comprising:

deriving a measurement from the collected heterogeneous scalar measurement data; and scaling the derived measurement or the collected heterogeneous scalar measurement data.

4. The method of claim 3, wherein the normalizing normalizes the collected heterogeneous scalar measurement data, the scaled derived measurement, the scaled collected heterogeneous scalar measurement data, or the derived measurement.

5. The method of claim 1, wherein at least one of the collected heterogeneous scalar measurement data is formatted according to an SNMP protocol.

6. The method of claim 1, wherein the displaying further comprises displaying transformed heterogeneous scalar measurement data of a same type in a graphical representation.

7. The method of claim 6, wherein the same type includes at least measurement data from network devices detailing an unavailability percentage time of the network over a period of time.

8. The method of claim 1, wherein the displaying further comprises a formatting of the at least one transformed heterogeneous scalar measurement data and transfers the formatted data to a display unit.

9. The method of claim 8, wherein the display unit is remote from a formatting unit performing the formatting.

10. The method of claim 8, wherein the Internet transfers the formatted data to the display unit.

11. The method of claim 8, wherein the formatting of the at least one transformed heterogeneous scalar measurement data includes aggregating the at least one transformed heterogeneous scalar measurement data with the other transformed heterogeneous scalar measurement data, such that both the at least one transformed heterogeneous scalar measurement data and the other transformed heterogeneous scalar measurement are illustrated in a single graphical illustration.

12. The method of claim 1, wherein the displaying includes displaying the at least one transformed heterogeneous scalar measurement data on a subscription basis.

13. The method of claim 1, wherein the displaying further comprises displaying a graphical representation for each of the transformed heterogeneous scalar measurement data.

14. The method of claim 1, wherein the displaying of the at least one transformed heterogeneous scalar measurement data includes displaying the transformed heterogeneous scalar measurement data in a single graphical representation, which includes additional transformed heterogeneous scalar measurement data that is heterogeneous from the at least one transformed heterogeneous scalar measurement data.

15. An apparatus to display heterogeneous scalar measurement data, comprising:
 a plurality of data collectors to collect heterogeneous scalar measurement data from a plurality of network devices, at least two of the plurality of devices controlled by heterogeneous protocols;
 a normalization unit to normalize heterogeneous scalar measurement data, based on the collected heterogeneous scalar measurement data, by using a mathematical transform to transform at least two heterogeneous scalar measurement data each into a homogeneous mathematical transform space; and
 a display unit to display at least one of the two transformed heterogeneous scalar measurement data.

16. The apparatus of claim 15, further comprising:
 a derivation unit to derive a measurement from the collected heterogeneous scalar measurement data;
 a scaling unit to scale the derived measurement or the collected heterogeneous scalar measurement data.

17. The apparatus of claim 16, wherein the normalization unit normalizes the collected heterogeneous scalar measurement data, the scaled derived measurement, the scaled collected heterogeneous scalar measurement data, or the derived measurement.

18. The apparatus of claim 15, wherein at least one of the collected heterogeneous scalar measurement data is formatted according to an SNMP protocol.

19. The apparatus of claim 15, wherein the displaying unit displays the transformed heterogeneous scalar measurement data in a single graphical representation, which includes additional transformed heterogeneous scalar measurement data that is heterogeneous from the at least one transformed heterogeneous scalar measurement data.

20. A medium that provides instructions for displaying heterogeneous scalar measurement data, which, when executed by a machine, cause the machine to perform operations comprising:
 collecting heterogeneous scalar measurement data from a plurality of devices connected to a network, at least two of the plurality of devices controlled by heterogeneous protocols;
 normalizing the collected heterogeneous scalar measurement data by using a mathematical transform to transform at least two heterogeneous scalar measurement data each into a homogeneous mathematical transform space; and
 displaying at least one of the two transformed heterogeneous scalar measurement data.

21. The medium of claim 20, wherein the instructions further cause the machine to perform operations comprising: deriving a measurement from the collected heterogeneous scalar measurement data; and scaling the derived measurement or the collected heterogeneous scalar measurement data.

22. The medium of claim 21, wherein the normalizing normalizes the collected heterogeneous scalar measurement data, the scaled derived measurement, the scaled collected heterogeneous scalar measurement data, or the derived measurement.

23. The medium of claim 20, wherein at least one of the collected heterogeneous scalar measurement data is formatted according to an SNMP protocol.

24. The medium of claim 20, wherein the displaying of the at least one transformed heterogeneous scalar measurement data includes displaying the transformed heterogeneous scalar measurement data in a single graphical representation, which includes additional transformed heterogeneous scalar measurement data that is heterogeneous from the at least one transformed heterogeneous scalar measurement data.

* * * * *